(12) United States Patent
Klassen et al.

(10) Patent No.: US 8,335,015 B2
(45) Date of Patent: Dec. 18, 2012

(54) SYSTEMS AND METHODS FOR BUILDING A COLOR LOOKUP TABLE FOR A PRINTER

(75) Inventors: R. Victor Klassen, Webster, NY (US); Yongda Chen, Pittsford, NY (US); Yonghui Zhao, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 611 days.

(21) Appl. No.: 12/560,709

(22) Filed: Sep. 16, 2009

(65) Prior Publication Data

US 2011/0063632 A1 Mar. 17, 2011

(51) Int. Cl.
*G06F 15/00* (2006.01)
*G06K 1/00* (2006.01)
(52) U.S. Cl. ............ 358/1.9; 358/518; 702/55; 382/162
(58) Field of Classification Search .................... 358/1.9, 358/518; 702/55; 382/162
See application file for complete search history.

(56) References Cited

U.S. PATENT DOCUMENTS

| | | | |
|---|---|---|---|
| 5,719,956 | A | 2/1998 | Ogatsu et al. |
| 5,892,891 | A | 4/1999 | Dalal et al. |
| 7,072,072 | B1 | 7/2006 | Balasubramanian et al. |
| 7,411,696 | B2 | 8/2008 | Maltz |
| 7,495,804 | B2 | 2/2009 | Rozzi |
| 2004/0109180 | A1* | 6/2004 | Braun et al. ................. 358/1.9 |
| 2005/0151982 | A1 | 7/2005 | Dyer |
| 2005/0249408 | A1* | 11/2005 | Haikin ........................ 382/167 |
| 2006/0227394 | A1 | 10/2006 | He |

OTHER PUBLICATIONS

Jonathan Richard Shewchuk, An Introduction to the Conjugate Gradient Method Without the Agonizing Pain, Aug. 4, 1994, Edition 11/4.*
Sharma, Models for Halftoned Samples, Digital Color Imaging Handbook, 2003, pp. 220-224, CRC Press, USA.
Billmeyer and Saltzman's Principles of Color Technology, 3rd Edition, 2002, pp. 128-130 and 211-215, John Wiley & Sons Inc.
Chen et al., A Multi-Ink Color-Separation Algorithm Maximizing Color Constancy, Journal of Imaging Science and Technology, 2008, pp. 277-281, vol. 52, No. 2.
Moroney et al., The CIECAM02 Color Appearance Model, IS&T/SID Tenth Color Imaging Conference, 2002, CIE Technical Committee.
Braun et al., Development and Evaluation of Six Gamut-Mapping Algorithms for Pictoral Images, Digital Imaging Technology Center, Webster, NY, in Proc. Color Imaging Conference. 1999, pp. 144-148.

(Continued)

*Primary Examiner* — Benny Q Tieu
*Assistant Examiner* — Moustapha Diaby
(74) *Attorney, Agent, or Firm* — Pillsbury Winthrop Shaw Pittman, LLP

(57) ABSTRACT

Color separation systems and methods improve color constancy and smoothness of a color lookup table (LUT) for a printer. A plurality of nodes of the LUT may be defined in colorimetric space, and the nodes out of the printer gamut may be mapped to the printer gamut surface. A set of possible colorant combinations are then determined that produce each node in the LUT in a device independent color space using a non-linear minimization algorithm, such as, for example, a conjugate gradient algorithm. Next, a colorant combination may be determined for each and every node in the LUT based on an image quality metric. In some implementations, a smoothing filter may be used to smooth the lookup table.

29 Claims, 4 Drawing Sheets

OTHER PUBLICATIONS

Color Theory Basics—Undercolor Removal & Gray Component Replacement, Rich & Associates, LLC, obtained from http://www.jimrich.com/tips_ct4.shtml on Jun. 5, 2009.
Hestenes et al., Methods of Conjugate Gradients for Solving Linear Systems, Journal of Research of the National Bureau of Standards, Dec. 1952, vol. 49,.No. 6, Research Paper 2379.
Shewchuk, An Introduction to the Conjugate Gradient Method Without the Agonizing Pain, Edition 1¼, Aug. 4, 1994, Pittsburgh, PA.
Yongda Chen, U.S. Appl. No. 12/540,161, filed Aug. 12, 2009.
Lalit Keshav Mestha, U.S. Appl. No. 12/504,332, filed Jul. 16, 2009.
Alvaro E. Gil, U.S. Appl. No. 12/533,542, filed Jul. 31, 2009.

* cited by examiner

SYSTEMS AND METHODS FOR BUILDING A COLOR LOOKUP TABLE FOR A PRINTER

FIELD

This application generally relates to the management and reproduction of colors by a printing system, and in particular, systems and methods for building a color lookup table for a printer.

BACKGROUND

As digital color printing demands continue to grow, there is a continuing need for color reproduction improvement. Most color print profiles technologies often focus on color accuracy and smoothness of the color lookup table (LUT).

For a three-ink cyan, magenta and yellow (CMY) printer, the mapping from ink amounts to colorimetric coordinates is unique and various interpolations or fitting techniques can be applied directly. For a four-ink CMYK printer where K represents black ink, redundancy is introduced with the addition of the black ink. Generally a unique color can be produced by one CMY ink combination, whereas there may be many CMYK ink combinations that may produce the same color, depending on the black ink amount. The inverse characterization for a CMYK ink set is generally performed by various methods of controlling the black ink amount. These methods may include black addition, under-color removal (UCR), or gray-component replacement (GCR), which are traceable to the graphic arts printing industry. Generally, the GCR level is determined by checking the graininess of prints or decreasing printing cost by replacing the expensive chromatic colorants with the black colorant.

However, adjusting the black ink using a gray component replacement strategy can negatively affect the color constancy of the print.

SUMMARY

According to one embodiment, a method for creating a color lookup table for a printer comprises: defining a plurality of nodes in a lookup table, the nodes mapping device independent color space to device specific colorant combinations based on a printer model; determining a set of device specific colorant combination values for each node in the lookup table using a non-linear minimization algorithm to determine potential colorant combinations; and determining a colorant combination for each node in the lookup table based on an image quality metric.

According to another embodiment, a system for creating a color lookup table for a printer comprises: a processor configured to: define a plurality of nodes in a lookup table, the nodes mapping device independent color space to device specific colorant combinations based on a printer model; determine a set of device specific colorant combination values for each node in the lookup table using a non-linear minimization algorithm to determine potential colorant combinations; and determine a colorant combination for each node in the lookup table based on an image quality metric.

According to yet another embodiment, a computer-readable storage medium comprises computer-readable instructions stored therein that when executed by a processor are configured to implement a method for creating a color lookup table for a printer.

Other features of one or more embodiments of this disclosure will seem apparent from the following detailed description, and accompanying drawings, and the appended claims.

BRIEF DESCRIPTION OF THE DRAWINGS

Embodiments of the present disclosure will now be disclosed, by way of example only, with reference to the accompanying schematic drawings in which corresponding reference symbols indicate corresponding parts, in which.

DETAILED DESCRIPTION

This application is related to U.S. patent application Ser. No. 12/540,161 filed Aug. 12, 2009, herein incorporated by reference in its entirety.

Systems and methods for improving color constancy and smoothness of a color lookup table (LUT) for a printer are disclosed for improving the management and reproduction of colors by a printing system.

Color constancy is the tendency of the color of an object to remain constant when the level and color of the illumination are changed. It is an important property of imaging materials, and is a result of both physiological and psychological compensation. The phenomenon is only approximate, however, and surfaces do not retain their daylight colors when viewed under certain fluorescent light sources or monochromatic radiation. Certain surfaces appear to change remarkably from one light source to another, and such surfaces are said to lack color constancy or be color inconstant.

Color inconstancy, on the other hand, is the tendency of the color to look different under different lighting conditions, and is a very important factor to evaluate the image quality of prints. Colors may often deviate significantly in hue when viewed under different light. For instance, color inconstancy occurs frequently when profiles are created for standardized daylight (D50) but viewed under narrow-band fluorescent illumination (F11). Since prints may be viewed under many different lighting conditions, color inconstancy is a very important factor to evaluate the image quality of prints.

Though different ink combinations with different spectra show similar perceptual colors under a specific illuminant, they may shift in different perceptual directions when the illuminant is changed causing a color-uniform image to become non-uniform.

According to one or more embodiments, color separation systems and methods improve color constancy of a color lookup table (LUT) used by a printing system.

Initially, a high-accurate spectral printer model is developed. Next, a set of colorant combinations for each node in calorimetric space are found to form a large potential colorant combination database. The optimal colorant combination may then be selected based on the perceptual image quality metric. And a smoothness metric may be added into the perceptual metric to determine the final colorant combination.

In one implementation, the image quality metric may include the weighted sum of a color inconstancy index (CII) and a gray component replacement (GCR) strategy.

This methodology may also be used to improve other image quality criteria, such as graininess, sharpness or print precision. These applications rely on the existence of corresponding models, such as a graininess model, or a sharpness model.

Figure 1:
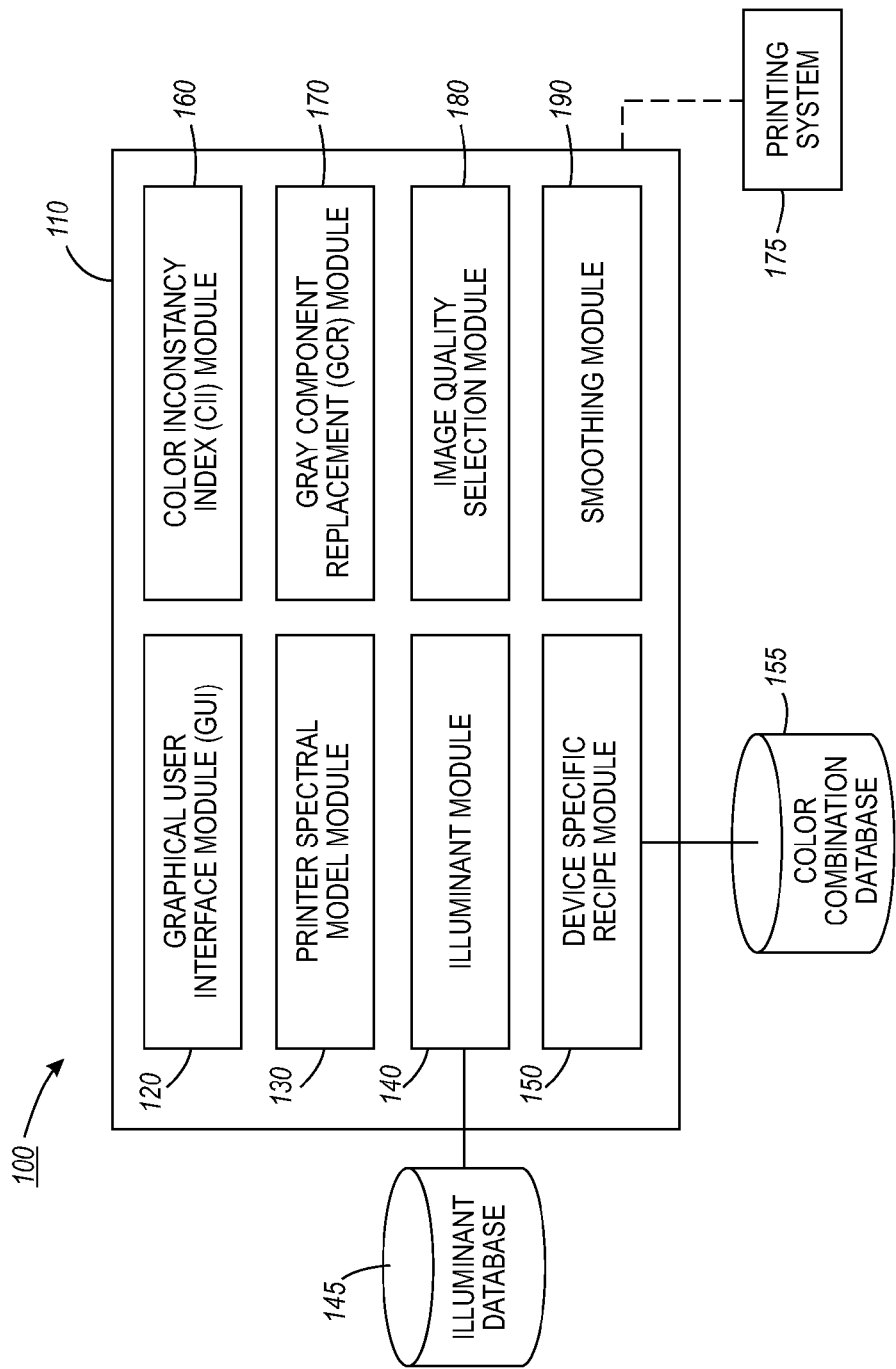
FIG. 1 shows one example of a system architecture for improving color constancy and smoothness of a color lookup table (LUT) for a printer according to an embodiment.

FIG. 1 shows one example of a system architecture 100 for improving color constancy and smoothness of a color lookup table (LUT) for a printer according to an embodiment.

The LUT may be any data set suitable for converting digital color image data from one color space to another. For instance, color look-up tables are commonly used in the art for converting from one color space to another, either directly, or by interpolation. In the direct case, the input color space coordinates may be used as indices into the look-up table, and the resulting color is found at the indexed location. For interpolation, the high order bits of the input color space coordinates may be used as indices into the look-up table, and some method, such as a (commonly) tetrahedral interpolation algorithm, may use the low order bits and neighboring nodes in the look-up table to compute the output color.

The system 100 may include an application 110 having a plurality of modules, including but not limited to, a graphical user interface module 120, a printer spectral model module 130, an illuminant module 140, a device specific recipe module 150, and color inconstancy index module 160, a gray component replacement module 170, and an image quality metric selection module 180, and a smoothing module 190. One or more of the modules comprising application 110 may be combined and/or include additional modules.

The application 110 may interface with one or more additional systems, such as an illuminant database 145, and color colorant combination database 155. Moreover, the application 110 interfaces with a printing system 175. For some purposes, not all modules and elements may be necessary.

According to one embodiment, the application 110 may be software (firmware) created using any number of programming languages. Of course, it will be appreciated any number of hardware implementations, programming languages, and operating platforms may be used. As such, the description or recitation of any specific hardware implementation, programming language, and operating platform herein is exemplary only and should not be viewed as limiting. The application 110 may be stored on a computer- or machine-readable storage media having computer or machine-executable instructions executable by a processor. In one implementation, the application 110 may reside on a memory of the print controller of a printing system or the printing system itself. Application may also be implemented as a programmable processor, such as, for example a field-programmable gate array (FGPA) or an application-specific integrated circuit (ASIC) processor.

Alternatively or additionally, the application 110 may be a stand-alone application running on a computer which interfaces with a printing system, for example, through a remote network connection, or via a computer readable storage media (i.e., flash memory, DVD/CD ROM, floppy disk, removable or permanent hard drive etc.). In some implementations, the application 110 may be a "plug-in" application that is incorporated into a third-party software application including, for example, document-processing or image production applications. Other configurations may be also implemented.

The graphical user interface module 120 is configured to generate a graphical user interface (GUI) on a display device and to control the various display and input/output (I/O) features of the application. The graphical user interface module 120 may generate display signals to the display device. In one implementation, it may provide one more "windows" or panes for displaying information to the user. The display device may include a cathode ray tube (CRT), liquid crystal display (LCD), plasma, or other display devices.

Moreover, the graphical user interface module 120 allows the user to interact with the application 110. For example, the graphical user interface module 120 may permit use and operation of one more of: a keyboard, keypad, touch-screen, mouse, joystick, light pen, or other peripheral devices for receiving inputs from a user. Similarly, the application may output information and data to the user, for example, via a printer or other peripheral device (e.g., external storage device or networked devices).

The graphical user interface module 120 may interact with a computer's operating system and/or one or more other software applications. In one implementation, application 110 may comprise a stand-alone software application running on a computer, printing system, or other machine. Alternatively, a server (not shown) may host the application 110, which may, in some implementations require a user to access the server over a network to use the application. In some implementations, a user may download the application 110 from a server, with program updates made available (over the network or the Internet) as needed, or on a predetermined, regularly-scheduled basis. The application 110 may be operated in a Microsoft Windows® operating environment. However, other operating systems and environments (e.g., UNIX, Linux, and proprietary systems, such as Apple Mac OS X) are also envisioned. The printer spectral model module 120 permits the user to define and/or edit a spectral color printer model. Various spectral color printer models are known which may be used or adapted according to embodiments disclosed herein. Such a model is necessary in order to calculate the color difference under different illuminants and tristimulus values for various colorant combinations.

In one implementation, the spectral printer model may be based on the Yule-Nielsen spectral Neugebauer model to optimize the ink set because of its high accuracy and simple form. Of course, other known spectral models might similarly be used.

The illuminant selection module 140 provides the user with capabilities to select one or more light sources for consideration. For instance, the module 140 may display, in the graphical user interface, information regarding light sources and illuminants for which the user may "tag" or otherwise select for consideration. The illuminant selection module 140 may interface with at least one illuminant database 145, which store or maintains spectral data for one or more light sources.

There is a variety of light sources available in the market. Spectral models of the light sources based on color temperature are also available. In addition to collecting the spectra for known light sources, light measurement sensors may be to used determine the spectra for non-standard light sources. Collecting various spectra may be done as a one-time process. Existing entries may be subsequently modified and/or new entries may be added to the illuminant database 145, as desired.

Other spectral distribution data may be obtained from various resources. For example, many light source manufacturers may provide spectral distribution information on their products.

Figure 3:
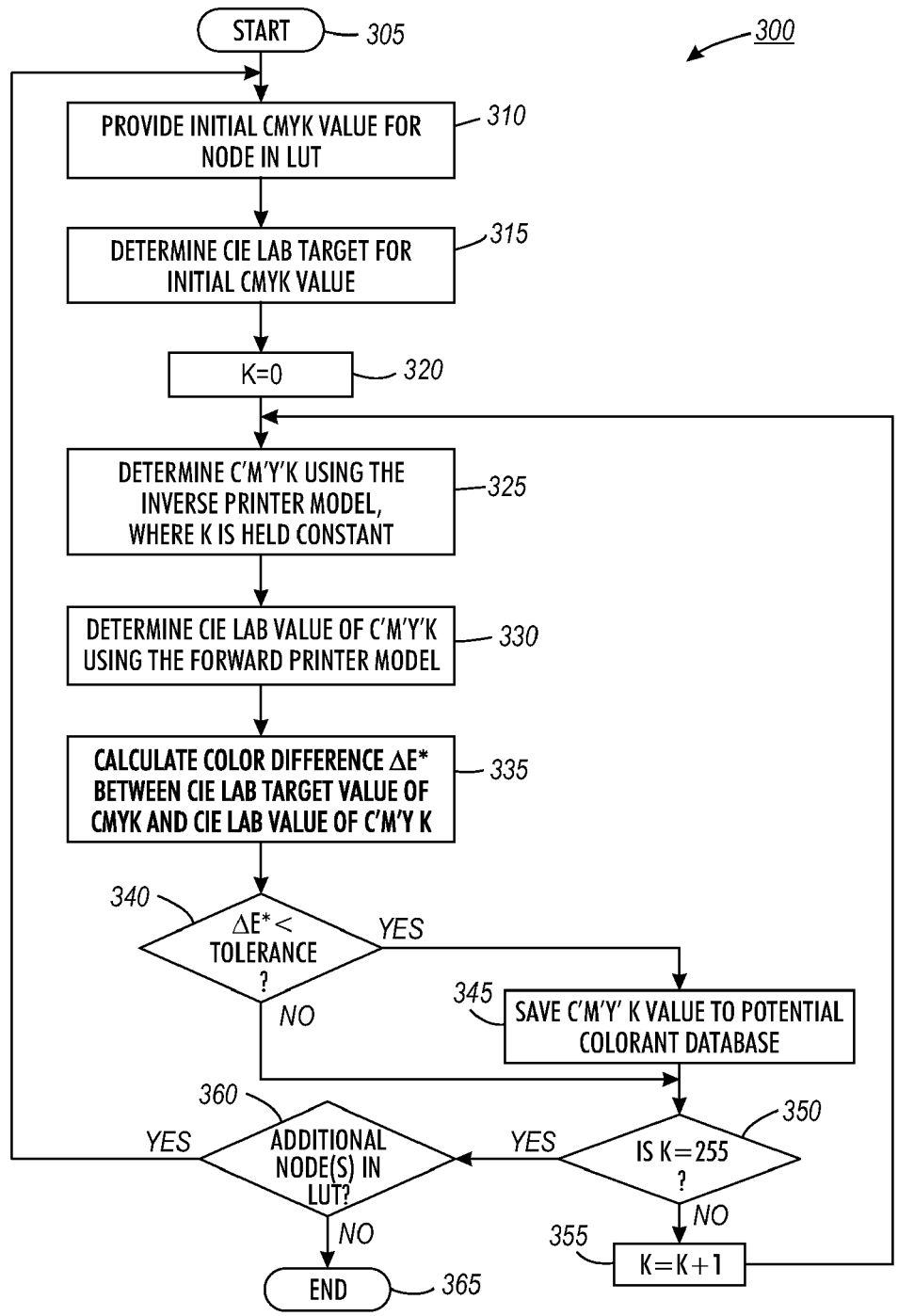
FIG. 3 shows one example of a method for creating the colorant combinations database, according to an embodiment.
Figure 4:
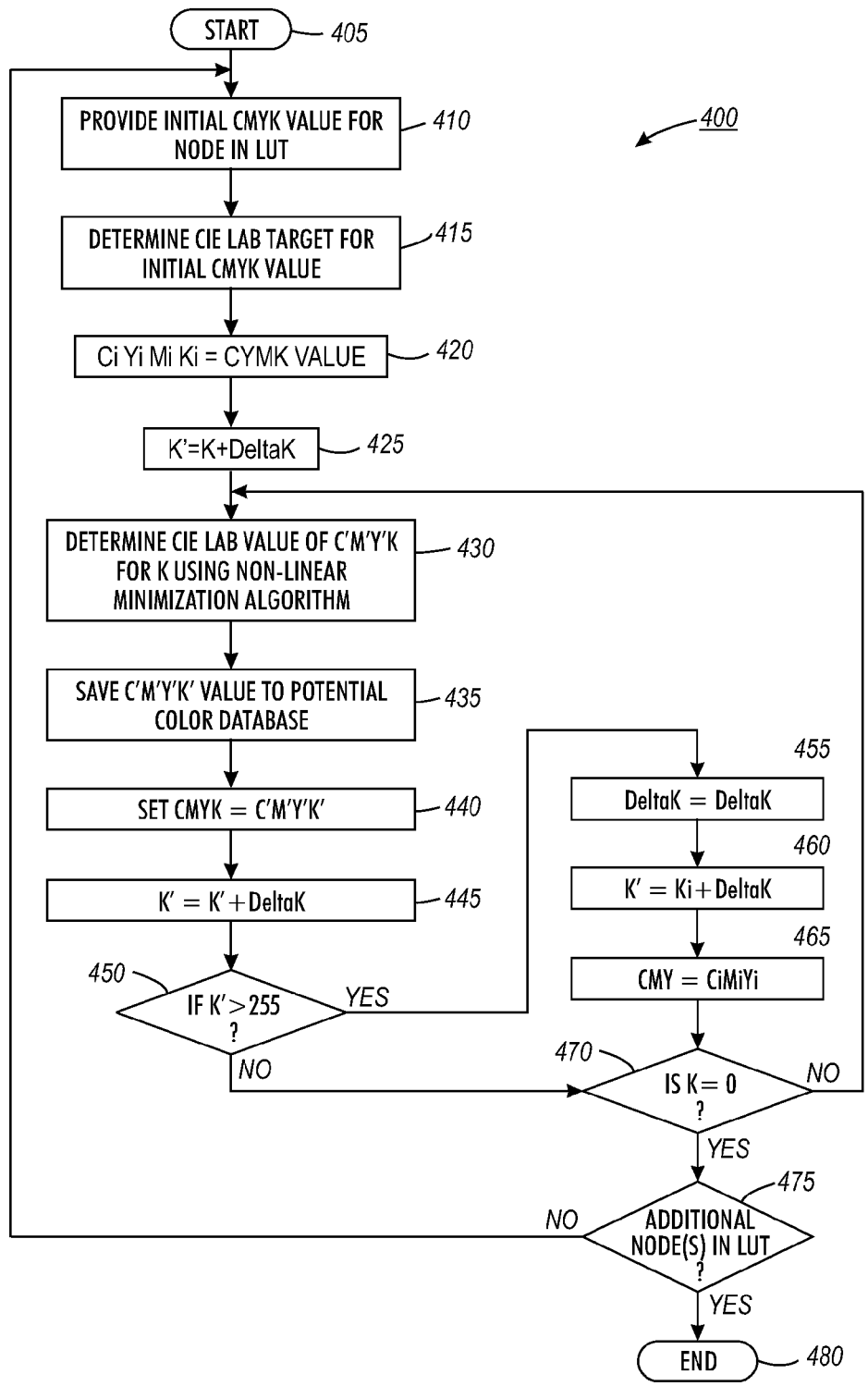
FIG. 4 shows another example of a method for creating the colorant combinations database, according to an embodiment.

The device specific recipe module 150 is configured to generate nominal device recipe information, for example, CMYK values for various colors according to the printer model. The module 150 may be used to generate entries for a color combination database 155. FIGS. 3 and 4 portray two such processes.

The color inconstancy index (CII) module 160 and gray component replacement (GCR) module 170 may be configured to build and implement a color inconstancy index (CII) and GCR strategy, respectively. These are discussed in more detail below.

The printing system 175 may include any printing device capable of color printing technology such as, for example, ink-jet (bubble jet), laser, offset, solid-ink, dye sublimation, xerography, etc., in which color is rendered by using a plurality of process colors (e.g., CMYK).

The image quality selection module 180 is configured to determine an optimal colorant combination based on the perceptual image quality metric, which is the weighted sum of color inconstancy index (CII) and gray component replacement (GCR) settings: that is distance from desired grey component replacement amount. In some implementations, additional criteria and/or constraints may be considered. A sample with a minimized image quality metric value may be selected for each node in the lookup table.

The optimized recipe information may then be transmitted to a color management profile in the memory of the printing system 175. When desired, the printing system may print a color using the optimized recipe information.

In addition, the module 180 may automatically choose and/or recommend the optimal recipe that provides lowest color dispersion across a variety of spectra under consideration. Results may be displayed in the graphical user interface.

The smoothing module 190 interacts with the color combination database to improve the "smoothness" of the lookup table. An unsmooth color lookup table may cause contours therein, which can degrade the print quality. This is because at the gamut corners, there may be only one or two colorant combinations that can satisfy color reproduction accuracy. Local smooth techniques may not always be able achieve global smoothness requirements. Thus, a global smoothing technique may be used to smooth the color lookup table. In one implementation, the smoothing may be any process that has the tendency to reduce the maximum value of the second or higher derivative of a function.

Figure 2:
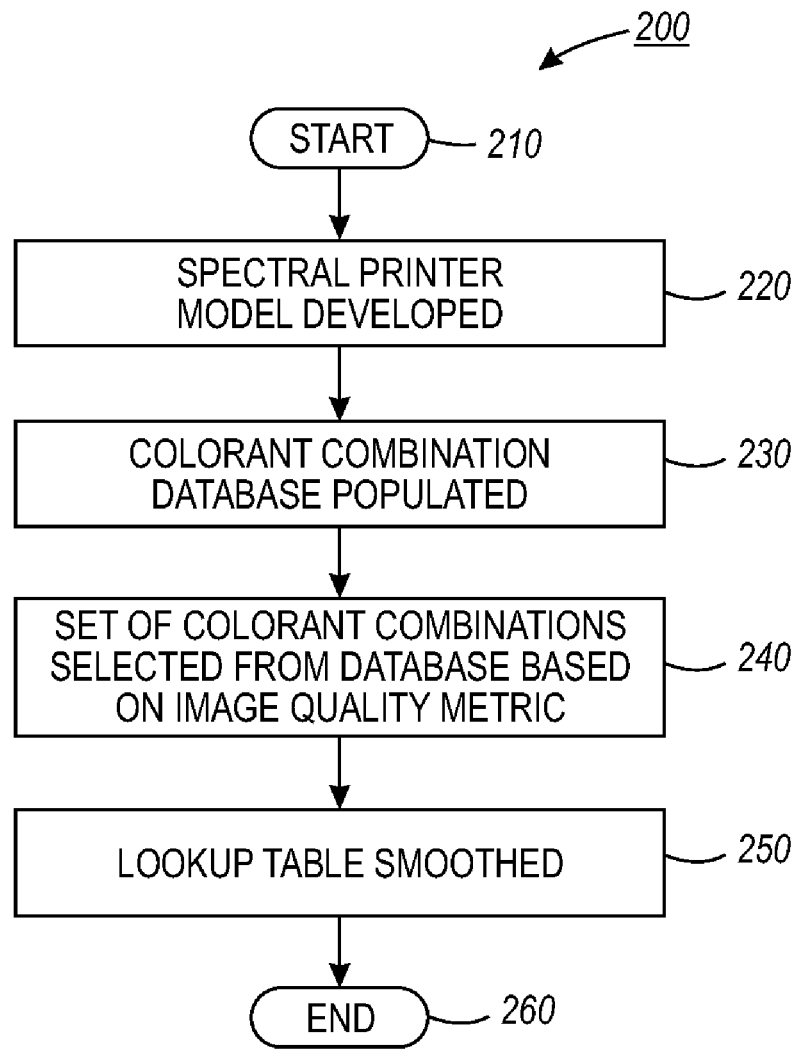
FIG. 2 shows one example of a method for improving color constancy and smoothness of a color lookup table (LUT) for a printer according to an embodiment.

FIG. 2 shows one example of a method 200 for improving color constancy and smoothness of a color lookup table (LUT) for a printer according to an embodiment. The method begins in step 210.

In step 220, a spectral printer model is developed to define a printer behavior, including printer gamut, and describes the relationship between input and output. A spectral color printer model is used in order to calculate the color difference under different illuminants and tristimulus values for various colorant combinations. In one implementation, the spectral printer model may be based on the Yule-Nielsen spectral Neugebauer model to optimize the ink set because of its high accuracy and simple form. A discussion of this model may be found, for example, in the Digital Color Imaging Handbook, edited by Gaurav Sharma, CRC Press (2003), pp. 220-224, herein incorporated by reference in its entirety. Of course, other known spectral models might similarly be used.

As known in the art, a forward print model converts device dependent colorant combinations to device independent color space. An inverse print model may be derived therefrom for converting device independent color space values to device specific colorant combination values. In one implementation, four process colors (e.g., CMYK) may be used.

However, printers having additional colorants are also known. Six-color printing, for instance, may provide a larger gamut of colors than can be obtained from the traditional four-color printing process. A six-ink printer may include cyan, magenta, yellow, black, orange and violet (CMYKOV). Other colorants are also possible, as known in the art, such as green (G), light cyan (c), light magenta (m), which may be used in combination with or as an alternative to the standard four colorants CMYK.

When building the printer model it may be advantageous to exclude certain colorant combinations which are not likely to, or may never, be used. This may significantly reduce the number of nodes in the printer model, saving memory and/or processing time and resources.

Accordingly to an embodiment, six-color printing may be reformulated as multiple four-color printing. These multiple four-color gamuts overlap with each other and the union of all these gamuts can cover the entire six-color gamut. For example, in a CMYKOV printer, there are ten 4-color combinations: CMYK, CMOK, CMVK, CYOK, CYVK, COVK, MYOK, MYVK, MOVK, YOVK. In order to reduce 4-color combinations and keep lookup table smoothness, some of the four-color combinations may be disregarded.

One approach may be to prohibit the coexistence of opposite colorant pairs (e.g., yellow/violet and cyan/orange). When mixed, opposite colors such as these generally produce a redundant neutral color (i.e., black). Therefore, by this approach, only four 4-color combinations would be used: CMYK, OMYK, CMVK, and OMVK. A color look up table for each of the four-color combinations may be used instead of a single 6-color LUT. This may provide a significant reduction of memory resources. For instance, for 8 bit data (256 values for each color): a six color LUT would require $2.81 \times 10^{14}$ ($256^6$) nodes while four 4-color LUTs would require only $1.72 \times 10^{10}$ ($4*256^4$) nodes.

Alternatively or additionally, certain portions (and nodes) of the gamut may be excluded that are not likely to be used. For example, in the portion of CMYKOV space far from violet (V) (i.e., characterized by low or zero M or C, but high Y), colorant combinations which include some V may not be useful. That is because this portion of the model would include large amounts of Y, and small amounts of M and C. A similar approach would work for orange (O). To produce O would use some combination of Y and M, and no C, so the portion of color space far from O would have large amounts of C and small amounts of Y and M.

In one implementation, a parameter p may be provided that represents the amount of the primary process colors (e.g., C, Y and M) to the total ink or toner. These primary colors will generally make the greatest contribution to color. When there is no M or C in the (CMY) input color trying to use V in the output color would not be necessary and could be excluded. In some implementations, a blend may be created that includes some V when on the non-V side of the neutral axis, in particular for improved color inconstancy.

The parameter p may be dependent on the particular printer, as well as inks or toners involved. If the total ink coverage of CYM exceeds p, then that colorant combination may be excluded from the colorant database. For instance, p=250% on a printer that may have 100% each of any two colorants, and 50% of a third, but no more.

In other implementations, very dark portions of the color model may not need to be sampled as finely as light portions. This is because the color difference between these nodes in likely to be very small. Darkness may be computed using a model to determine sampling density. One exemplary model for darkness of a color the "YES" color model, as follows:

$$Y=0.253R+0.684G+0.063B,$$

In order to obtain R, G, B, one simple model is
R=(1-c)(1-k);
G=(1-m)(1-k);
B=(1-y)(1-k),
where c, m, y and k are cyan, magenta, yellow and black.

In this case, Y correlates to intensity or lightness, where small values of Y are darker. The sampling density of nodes may, for instance, be proportional to the value of Y. In another implementation, nodes corresponding to combinations with too much ink or toner coverage may be excluded or sampled less frequently. Ink coverage, for instance, may be calculated as the sum of the separation values to the total ink, expressed as a percentage. It is normally a printer-dependent parameter. When a colorant combination is being considered, its total coverage value can be calculated, and tested against a predetermined limit before proceeding. Common limits range from 180% to 280%, depending on the type of colorant (ink or toner), paper (coated or plain) and/or the printer.

This may be implemented by non-uniform node spacing of an incomplete lattice. Where colors are left out the measurements, due to coverage constraints, the virtual measurement may be extrapolated from those have been measured.

Next in step 230, a colorant combination database is populated for the printer gamut.

The regular nodes for the LUT may be defined in a device independent color space, such as CIE Lab color space, which maps to device dependent colorant combinations.

These CIE Lab values may be thought of as the target color value for that node. While discussion herein primarily refers to CIE Lab color space, it will be appreciated that other device-independent color spaces could also be used, such as, for example, CIE 1976 (L*, u*, v*), CIE XYZ, LCH, etc.

Different device dependent colorant combinations may be calculated for each node in the lookup table. There is only one colorant combination CMYK available for each node on the gamut boundary. However, there may be a number of color combinations for the nodes inside of the gamut. Thus, the total number of colorant combinations may be limited and determinable. These values may then be determined based on an inverse printer model as known in the art.

Most color management systems rely upon 8 bit data processing. For 8-bit CYMK color data, for instance, there may up to a maximum of $2^8$ or 256 C'M'Y' K' quadruplets for each node, which generally correspond to the same CMYK color combination, where the black (K) values are changed from 0 to 255. This set of C'M'Y' K' quadruplets of varying black ink or toner can be determined for each CMYK node from the printer model. Although the method is disclosed for use with 8 bit data, it will be appreciated that higher or lower bit depths could similarly be used.

As the black (K') value is varied, different C'M'Y' K' colorant combinations may be calculated that best correspond to the target CIE Lab values using the forward printer model. The CIE Lab values of the C'M'Y'K' values, however may only be somewhat similar to the target CIE Lab values. Thus, from among these possible values, only those colorant combinations whose color difference is within a predetermined tolerance of the target CIE Lab values will be further considered. For example, the tolerance may be set to 0.3 ΔE* (delta-E).

In one implementation, each possible value of K is used to compute a C'M'Y' for that K. In another implementation, only a subset of the values of K (such as 16-32 values) are used to find a subset of C'M'Y' values, and other values of C'M'Y' for intermediate values of K are computed using interpolation between the subset values. The interpolation may include spline, polynomial, quadratic, or another curve fitting technique.

When using a printer having more than four colorants, the problem may be reduced, as described above, to four color subsets. If four-color subsets are used, then the method of the preceding paragraph (i.e. varying K and finding combinations of the remaining three to provide a match), may be used. However, that method typically must be applied to each subset whose gamut contains the desired color. Alternatively, a multi-dimensional manifold may be used, rather than a curve. For example, for a five color case, a two-dimensional surface may be fit to the set of colors that produce the desired color with two redundant colorants.

As a specific example of a five color case, consider the color (C, M, Y, O, K)=(10, 200, 45, 0, 5), where the numbers represent 8-bit color information coverage on a 0 to 255 scale, being produced on a printer that also has an orange colorant. In principle, one might find the CMY combination for all 256 possible levels of K and O. This would require finding the CMY combination for $256^2$ or 65536 different (K, O) combinations. Instead, if the (K, O) space is sampled at, for example, 16 points per dimension, only $16^2$ or 256 combinations need be found. From these 256 combinations, other combinations may be found by interpolation. Higher dimensions (e.g., 6 or more colorants) may be handled in a similar manner.

All of the colorant combinations that are within the predetermined tolerance may be collected to create the colorant combination database. The colorant combination database may be stored, for example, in memory as a lookup table. FIGS. 3 and 4 shows methods for creating the colorant combination database.

In step 240, a set of device specific color combinations from the colorant combination database may be selected based on an image quality metric. In one implementation, a color inconstancy index (CII) and a gray component replacement (GCR) strategy are used as image quality metric. Although it will be appreciated that in other implementation, other image quality metrics may be used.

The procedures for calculating the color inconstancy index and a GCR strategy are described in more detail below.

After a GCR strategy is specified, an ideal colorant combination may be determined for each node in the look-up table. For instance, this may be the closest match in the colorant combination database for that node. Normally a GCR strategy is defined in terms of the amount of K to add for a given CMY, and the modified amount of CMY after K addition. As understood in this disclosure, the GCR function is the difference between the CMYK produced and the CMYK that would have been produced if the GCR strategy had been followed.

The initial image quality selection metric may then be expressed as the weighted sum of color inconstancy index (CII) and the gray component replacement (GCR) function according to Equation (1), as follows:

$$f = k_1 \cdot \text{CII}(\text{CMYK}) + k_2 \cdot \text{GCR}(\text{CMYK}) \qquad (1)$$

Constants $k_1$ and $k_2$ are weighting factors to balance color constancy and GCR levels, which may be determined empirically and/or adjusted to user preference. In one implementation, $k_1$ and $k_2$ may be 0.5/max(CII) and 0.5/max(GCR), respectively.

Other image quality criteria may be optionally selected in some implementations as discussed below.

Next, in step 250, a global smoothing process may be applied to the lookup table. Smoothness is a factor for the quality of a lookup table. An unsmooth color lookup table may cause contours therein, which can deteriorate the print quality. This is because at the gamut corners, there may be only one or two colorant combinations that can satisfy color reproduction accuracy. Local smoothing techniques may not always be able achieve global smoothness requirements. Thus, a global smoothing technique may be used to smooth the color lookup table.

For example, a Gaussian filter may be used to smooth the initial colorant combination set to create a smoothed virtual color lookup.

Next, for each grid node point, the sum of the Euclidean distances between this point in the smoothed lookup table and values in the colorant combination database for this point are calculated, according to Equation (3) as follows:

$$DI = \sqrt{\sum_{ink=1}^{n}(dc_{ink,orig} - dc_{ink,smooth})^2} \quad (3)$$

From equation (3), a new metric, i.e., the smoothness index h, may be defined according to Equation (4) as follows:

$$h = DI(CMYK) \quad (4)$$

This processing smoothes the current set of nodes to obtain a new set of smoothed nodes, and then chooses the closest colorant combination to this new smoothed one from candidate colorant combinations by replacing the current one. Because the smoothing procedure is based on the current set of nodes, the new smoothed set may not be perfect. Therefore, the smoothing procedure may be performed multiple times (as needed) until (1) there are no new colorant combinations picked up to replace old ones; and/or (2) a maximum number of iterations has been reached (e.g., 3-5 times)

The colorant combination with the smallest error is selected as a new value for this node. The values for all the nodes may then be updated based on this new metric. The smoothing procedure may be repeated several times, as necessary, until the colorant combinations for each point converge to a particular value (i.e., they cannot be further updated). The method ends in step 260.

Color Inconstancy Index (CII)

The color inconstancy index (CII) is a tool that may be used to evaluate the color variation under different illuminants. For instance, the color inconstancy index may be derived from the spectra of colorant combinations calculated from the spectral printer model, where entries may be expressed according to color difference. Methodologies which may be used for building a color inconstancy index are disclosed by Roy Berns, "Billmeyer and Saltzman's Principles of Color Technology, 3rd Edition," John Wiley & Sons Inc. (2002), pp. 128-130, 211-215; and Chen et al. "A Multi-ink Color-Separation Algorithm Maximizing Color Constancy," Eleventh Color Imaging Conference: Color Science and Engineering Systems, Technologies, Applications (2003), pp. 277-281, herein incorporated by reference in their entireties.

For instance, according to one implementation, color differences across different illuminants may be calculated using the CIE 1994 Color Difference Model ("Delta-E") according to equation (5) below.

$$CII = \left[\left(\frac{\Delta L^*}{S_L}\right)^2 + \left(\frac{\Delta C_{ab}^*}{S_c}\right)^2 + \left(\frac{\Delta H_{ab}^*}{S_H}\right)^2\right]^{1/2} \quad (5)$$

where $$\Delta L^* = L^*_{refer\_c} - L^*_{test\_c}$$

$$\Delta a^*_{ab} = a^*_{refer\_c} - a^*_{test\_c}$$

$$\Delta b^*_{ab} = b^*_{refer\_c} - b^*_{test\_c}$$

$$\Delta C^*_{ab} = C^*_{refer\_c} - C^*_{test\_c}$$

$$\Delta H^*_{ab} = [(\Delta E^*)^2 - (\Delta L^*)^2 - (\Delta C^*)^2]^{1/2}$$

$$\Delta E^* = [(\Delta L^*)^2 + (\Delta a^*)^2 + (\Delta b^*)^2]^{1/2}$$

$$S_L = 1$$

$$S_C = 1 + 0.045 C^*_{refer,test}$$

$$S_H = 1 + 0.015 C^*_{refer,test}$$

$$C^*_{refer,test} = \sqrt{C^*_{refer\_c} \cdot C^*_{test\_c}}$$

Here $\Delta C^*_{ab}$ represents the difference of chroma, and $\Delta H^*_{ab}$ represents the difference of hue, and subscripts "refer" and "test" define reference and test illuminants, respectively. Of course, other color difference methodologies could also be used, such as CIE1976, CIE2000, CMC1984, etc. Tristimulus values (L*, a*, b*) may calculated for one or more test illuminants and a reference illuminant from the measured or predicted spectral reflectance. In one implementation, the *Colour Appearance Modelling for Color Management Systems* (CIECAM02) chromatic-adaptation transform published in 2002 by the CIE Technical Committee may be used. Corresponding colors are calculated from each illuminant to a "reference" illuminant. The reference and the test illuminants can be selected depending on what illuminants may be important for a particular user.

For example, a D50 or D65 illuminant may be selected as the reference illuminants to simulate sunlight/outdoors conditions, and the F11 or A illuminants may be selected as the test illuminants for office or indoor conditions.

Gray Component Replacement (GCR)

A GCR strategy is a known technique used in the color separation process that replaces the neutral gray portion in cyan, magenta, and yellow with black. Instead of using only cyan, magenta and yellow to produce gray value, they are produced with the black instead.

A desired GCR strategy may be selected and the colorant combination with minimum black (K) values used as ideal colorant combinations. The GCR strategy may be used to select optimal colorant combinations also. These colorants may be expressed as function of the device specific recipe values (e.g., CMYK) and the GCR function values thereof (e.g., GCR(CMYK)).

One known gray component replacement strategy can be expressed by the following Equations (6) to (10) by using $C^1$, $M^1$, and $Y^1$ signals at the time of reproducing a particular color by the three colors, cyan, magenta, and yellow:

$$K = \min\{C^1, M^1, Y^1\} \times \alpha \quad (6)$$

$$C = C^1 - K \cdot \beta \quad (7)$$

$$M = M^1 - K \cdot \beta \quad (8)$$

$$Y = Y^1 - K \cdot \beta \quad (9)$$

The coefficient $\alpha$ may be limited to ½ or less, while the coefficient $\beta$ is set, for example, to 1.

In this case, a reproduced color $P\{C^1, M^1, Y^1\}$ using three colors, cyan, magenta, and yellow, is substantially equivalent to a reproduced color P {C, M, Y, K} using four colors, cyan, magenta, yellow, and black, so that $$P\{C^1, M^1, Y^1\} \sim P\{C, M, Y, K\} \tag{10}$$

Accordingly, if the gray component replacement method is used as a premise, the following formula holds from Equations (6) to (10):

$$P\{C, M, Y, K\} \sim P\{C+K+\beta, M+K\cdot\beta, Y+K\cdot\beta, 0\} \tag{11}$$

Other GCR strategies may similarly be used. See, e.g., U.S. Pat. Nos. 7,411,696 and 5,719,956 and U.S. Patent Application Publications Nos. 2006/0227394 and 2005/0151982, herein incorporated by reference in their entireties.

Additional Image Quality Criteria

One or more additional criteria may also be used as criterion for the selection metric. These may include ink or toner amount, graininess, sharpness, maximum black ink or toner amount and print precision (e.g., color difference). These additional features may be treated as negative values so that the quality improves as the metric decreases in magnitude for all metrics. Various models may be known or derived for determining these criterion.

For instance, expert knowledge about how some separations will lead to better or worse print quality in attributes or derived based on experiments on the printer model may be utilized. Thus, one might observe that some regions of N-dimensional color space tend to have higher graininess, as observed by human observers, and attempt to avoid them. A model may then be developed.

Graininess may be a thought of as a function of CMYK values according to equation (12) below.

$$\text{Graininess} = f(C, M, Y, K). \tag{12}$$

One graininess model, i.e., a graininess index, is disclosed in Chen et al. "Multi-ink Color-Separation Algorithm Improving Image Quality" J. Imaging Science Technology 52(2) March-April 2008, herein incorporated by reference in its entirety.

The total toner or ink amount total_ink represents the amount of ink or toner for all colors, and the black ink or toner amount black_ink is the amount of black ink used according to Equations (13) and (14). These may be important for avoiding ink pooling, paper curl and other mechanical failures and to save ink.

$$\text{total\_ink} = C + M + Y + K \tag{13}$$

$$\text{black\_ink} = K \tag{14}$$

The image quality selection metric may be the weighted sum of color inconstancy index (CII), the gray component replacement (GCR) function and additional criteria, such as Graininess, total ink and black ink, as shown in equation (15).

$$f = k_1 \cdot \text{CII}(CMYK) + k_2 \cdot \text{GCR}(CMYK) - k_4 \cdot \text{graininess}(CMYK) - k_4 \cdot \text{total\_ink}(CMYK) - k_5 \cdot \text{black\_ink}(CMYK) \tag{15}$$

Weighting factors $k_1$, $k_2$, $k_3$, $k_4$ and $k_5$ may be determined empirically and/or adjusted to user preference to balance the various criteria, as discussed above. In one implementation, weighting factors $k_1$, $k_2$, $k_3$, $k_4$ and $k_5$ may be 0.2/max(CII), 0.2/max(GCR), 0.2/max(graininess), 0.2/max(total_ink) and 0.2/max(black_ink), respectively.

The colorant combination may be selected to minimize this total selection metric f, which is to minimize the color inconstancy index, the grey component replacement, graininess, total ink amount and black ink amount.

Ink or Toner Amount Constraints

For multiple ink printing, the ink or toner amount may be considered to avoid ink pooling, paper curl and other mechanical failures and to save ink. Thus, in some implementations, a total ink or toner limitation, i.e., total_ink_limitation, may be as a constraint condition to the image quality metric. This may be set as a constraint by the user. Also, a black ink or toner limitation, i.e., black_ink_limitation, may be used as a constraint.

The image quality metric may be the weighted sum of the color inconstancy index (CII) and the gray component replacement (GCR) function, where $k_1$ and $k_2$ are weighting factors to balance color constancy and GCR levels, subject to ink or toner constraints. Equation (16) shows the selection metric having constraints. These weighting factors may be determined empirically and/or adjusted to user preference, as discussed above.

$$f = k_1 \cdot \text{CII}(CMYK) + k_2 \cdot \text{GCR}(CMYK) \tag{16}$$

where sum(CMYK) ≦ total_ink_limitation; and/or
K ≦ black_ink_limitation

FIG. 3 shows one example of a method 300 for creating the colorant combinations database according to an embodiment. The method begins in step 305.

Next, in step 310, an initial colorant combination, CMYK quadruple, is provided for a node of the lookup table (LUT). In step 315, a CIE Lab target is determined for the CMYK value for that node using an inverse printer model.

Continuing to step 320, a value K representing the black (K) ink or toner value is set to zero. In step 325, a value C'M'Y' K is determined for the target CIE Lab value with the fixed value K using a forward printer model. It will be noted that K is initially set to zero in step 320, but is incrementally increased in step 355 up until it reaches a maximum value of 255 (for 8-bit data). The amount by which K is incremented at each step may be 1, or it may be an amount larger than one, if interpolation is to be used.

Further, in step 330, the CIE Lab value corresponding to the C'M'Y' K value is determined using a forward printer model. In step 335, the color difference ΔE* (delta-E) between the CIE Lab target value for the CMYK quadruple and the CIE Lab value of C'M'Y' K is determined. From there a determination is made in step 340 whether the color difference ΔE* is within a predetermined tolerance of 0.3. If yes, the C'M'Y' K value is saved to the colorant database in step 345. However, if not, the process continues to step 350, where the K value is incremented by 1, and the process returns to step 325.

Steps 320-355 may be repeated (as necessary) until the value of K is determined to be 255 (step 350). When this occurs it means that all 256 possible values of black (K) have been considered for that node.

In step 360, a determination is made whether there is at least one additional node to consider in the LUT. If yes, the process may return to step 310 and repeat (as necessary) for all the nodes in the LUT. Otherwise, once all nodes have been considered, the method ends in step 365.

FIG. 4 shows another example of a method 400 for creating the colorant combinations database according to an embodiment.

Method 400 builds a colorant combination database by finding a group of colorant combinations (or tuples) that give the appearance of the same "color" under some illuminant. From the group of colorant combinations, the best colorant may then be selected according to some metric (step 240). The method 400 uses a non-linear minimization algorithm to determine potential colorant combinations, whereas method 300 uses a forward printer model.

The method begins in step 405. In step 410, an initial colorant combination, is provided for a node of the lookup table (LUT). The colorant combination may be a 4 color combination, such as CMYK, or may be more than four colors. Thus, any reference to CYMK is merely illustrative and should not be construed as limiting.

In step 415, a CIE Lab target is determined for the colorant combination value for that node using an inverse printer model.

Continuing to step 420, the initial colorant combination value Ci Mi Yi Ki is stored in memory (for further consideration, see step 440, below) corresponding to the C M Y K value determined in step 415. The initial value of K' is Ki.

In step 425, a value K' representing the black (K) ink or toner value is adjusted by a step-wise value, deltaK, which may be 1, or it may be an amount larger than one, such as 8, if interpolation is to be used. Additionally or alternatively, other colors may be similarly treated as black.

Further, in step 430, the CIE Lab value corresponding to the C'M'Y' K' value is determined using a non-linear algorithm, such as a Conjugate Gradient (CG) method, to find new values of C'M'Y' which, when combined with K', minimize the error between the original L*a*b* and the L*a*b* produced by C'M'Y'K'.

In a conjugate gradient algorithm, a function to minimize, a vector of fixed parameters to the function, and a vector of variable parameters to the function are input. The algorithm finds the values of the variable parameters for which the function is minimized. See Jonathan Richard Shewchuk, *An Introduction to the Conjugate Gradient Method Without the Agonizing Pain*, Carnegie Mellon University, August 1994, herein incorporated by reference in its entirety.

For instance, the conjugate gradient algorithm receives a function, which has L*a*b* and K (in the 4 color case) as the fixed parameters, and C, M, Y as the variable parameters, and the function to minimize is the color difference between the L*a*b* input and the L*a*b* predicted by the inverse printer model when supplied with the current C, M, Y and K values.

A non-linear solver (such as a conjugate gradient) may perform best when given a "good" initial guess. One first guess may be to use the value CMY. Another approach may be to use the CMY value plus the step in CMY space that was taken on the previous pass through this loop.

In step 435, the value C' M' Y' K' which was determined in step 430, is stored in the potential colorant database.

Next in step 440, the current value colorant value CMYK is set to the values previously determined in step 435 and the value of K' is adjusted by deltaK in step 445.

Steps 430-445 may be repeated (as necessary) until the value of K' is determined to be 255 (see step 450). When this occurs it means that all values of black (K) greater than the initial value have been considered for that node. (Of course, in a system in which colors are specified other than with eight bit integers, the value of 255 would be substituted with the maximum value in that system).

On subsequent passes (discussed in more detail below), all values of black (K) less than the initial values will be considered for that node.

In step 450, a determination is made whether K' is greater than 255. If yes, the process continues to step 455. Otherwise, the process goes to step 470. In the previous set of passes, i.e., steps 430-445, the value of K' is incremented towards 255 by deltaK. Once reaching 255, the value of K' will then be decreased by deltaK (from the initial value) in the subsequent set of passes toward 0.

In step 455, deltaK is set to −deltaK (i.e., the negative value of itself). Also, in step 460, the current value of black, K' is set to the initial guess Ki adjusted by value of deltaK, and in step 465, the values of C M Y K are restored to their initial values Ci Mi Yi Ki (from step 420).

In step 475, a determination is made whether there is at least one additional node to consider in the LUT. If yes, the process may return to step 410 and repeat (as necessary) for all the nodes in the LUT. Otherwise, once all nodes have been considered, the method ends in step 480.

One can readily apply the above method to additional dimensions in a similar manner. Indeed, to take on more dimensions, one would likely want to increase deltaK to something larger than 1 to reduce processing resources. The value of deltaK may depend, for example, on the number of dimensions, and/or available time.

The above-described method 400 is for four color dimensions, with one redundant color. For five color dimensions, with two redundant colors, one may hold one dimension (i.e., one of the two redundant colors) constant and apply the above method, and then take a single step in the other dimension (i.e., the other of the two redundant colors, and using the computed value before the single step as a first guess for conjugate gradient in the second dimension.

For example, consider a color combination, CMYOK=(10, 20, 200, 39, 10). In a first run through all values of black (K), the orange (O) values may be held at 39 to find the CMY values that produced the same color. Then with K=10, deltaO may be added to 39 (O') which may be used for a starting guess of (10, 20, 200, 39+deltaO, 10) to be refined by conjugate gradient algorithm. Next, deltaC, deltaM, deltaY may be computed as the difference between the just-found C'M'Y' and (10, 20, 200), and added to the last pass for K+deltaK. This provides a good first guess using (C'M'Y', O+deltaO, K+deltaK). This proceeds up the row of K values holding O fixed at 39+deltaO.

The process may be repeated until all values of K have been considered, and then once again deltaO may be added to O, and the process continues. This is a similar procedure, as in the loop above, except that locations parameterized by two dimensional (O, K) values are determined, rather than along the K line. Additional dimensions (i.e., redundant colorants) may be similarly considered.

A color separation methodology has been disclosed to improve color constancy of prints when building color lookup tables. One can imagine any number of criteria that can be used as selection metrics, individually or combined, such as ink amount, graininess, sharpness, maximum black ink amount, and print precision. See, for instance, Chen et al. "Multi-ink Color-Separation Algorithm Improving Image Quality," mentioned above. In one implementation, the combination of color constancy and gray component replacement may be used as selection criteria among ink combinations yielding a similar color. The prints produced from this lookup table can keep similar perceptual sense under different illuminants.

While this disclosure has been described in connection with what is presently considered to be the most practical and preferred embodiment, it is to be understood that it is capable of further modifications and is not to be limited to the disclosed embodiments, and this disclosure is intended to cover any variations, uses, equivalent arrangements or adaptations of the inventive concepts following, in general, the principles of the disclosed embodiments and including such departures from the present disclosure as come within known or customary practice in the art to which the embodiments pertains, and as may be applied to the essential features hereinbefore set forth and followed in the spirit and scope of the appended claims.

What is claimed is:

1. A method for creating a color lookup table for a printer, the method comprising:
   defining a plurality of nodes in a lookup table, the nodes mapping device independent color space to device specific colorant combinations based on a printer model;
   determining a set of device specific colorant combination values for each node in the lookup table using a non-linear minimization algorithm to determine potential colorant combinations; and
   determining a colorant combination for each node in the lookup table based on an image quality metric,
   wherein the set of device specific colorant combination values for each node excludes device specific colorant combination values having a total ink coverage of primary process colors (CYM) greater than a predetermined value and device specific colorant combination values that are sampled less frequently so as to reduce the number of nodes in the look-up table.

2. The method according to claim 1, further comprising: mapping out of gamut color combinations to the printer gamut boundary.

3. The method according to claim 1, further comprising smoothing the nodes in the lookup table.

4. The method according to claim 3, wherein smoothing comprises:
   applying a smoothing filter to values in lookup table;
   calculating the Euclidian distances between the smoothed entries and each of the values in the set of potential colorant combinations; and
   selecting the colorant combination with the smallest Euclidean distance be used a new value for each node.

5. The method according to claim 1, wherein determining a colorant combination for each node in the lookup table based on the image quality metric comprises selecting the colorant combination that minimizes the image quality metric.

6. The method according to claim 1, wherein the image quality metric is based at least on a function of a perceptual color difference value under different illuminants and a gray component replacement strategy.

7. The method according to claim 1, where determining the set of device specific colorant combination values for each node in the lookup table comprises:
   providing an initial device dependent colorant combination for a node;
   determining a target value for the initial device dependent colorant combination;
   adjusting the device dependent colorant value for a redundant colorant;
   determining a colorant combination for the node using the resultant colorant combination value as an initial guess for the non-linear minimization algorithm; and
   repeating, as necessary, the adjusting and determining steps until various values of the redundant color have been considered.

8. The method according to claim 7, wherein adjusting the device dependent colorant value for a redundant colorant comprises performing a step-wise increase or decrease of the device dependent colorant value.

9. The method according to claim 7, wherein repeating comprises performing:
   one or more first passes in which the device dependent colorant value for a redundant colorant value is increased stepwise from the initial colorant value up to a maximum value; and
   one or more second passes in which the device dependent colorant value for a redundant colorant value is decreased stepwise from the initial colorant value down to a minimum value.

10. The method according to claim 1, further comprising interpolating between the device specific colorant combination values for each node in the lookup table that are within a predetermined color difference from the node to produce additional device specific colorant combination values.

11. The method according to claim 1, wherein the non-linear minimization algorithm is a conjugate gradient algorithm.

12. The method according to claim 1, wherein the printer is a six-ink printer that includes cyan, magenta, yellow, black, orange and violet (CMYKOV) colors.

13. The method according to claim 1, wherein the predetermined value represents the amount of primary process colors (CMY) to the total ink or toner coverage.

14. The method according to claim 1, wherein the coexistence of opposite colorant pairs is prohibited so as to reduce the number of nodes in the look-up table.

15. The method according to claim 14, wherein the opposite colorant pairs include yellow and violet colorant pair and cyan and orange colorant pair.

16. The method according to claim 1, wherein the method is performed by at least one processor.

17. A system for creating a color lookup table for a printer, the system comprising:
   at least one processor configured to:
      define a plurality of nodes in a lookup table, the nodes mapping device independent color space to device specific colorant combinations based on a printer model;
      determine a set of device specific colorant combination values for each node in the lookup table using a non-linear minimization algorithm to determine potential colorant combinations; and
      determine a colorant combination for each node in the lookup table based on an image quality metric,
      wherein the set of device specific colorant combination values for each node excludes device specific colorant combination values having a total ink coverage of primary process colors (CYM) greater than a predetermined value and device specific colorant combination values that are sampled less frequently so as to reduce the number of nodes in the look-up table.

18. The system according to claim 17, wherein the processor is configured to map out of gamut color combinations to the printer gamut boundary.

19. The system according to claim 17, wherein the processor is further configured to smooth the nodes in the lookup table.

20. The system according to claim 19, wherein in smoothing the nodes in the lookup table the processor is configured to:
   apply a smoothing filter to values in lookup table;
   calculate Euclidian distances between the smoothed entries and each of the values in the set of potential colorant combinations; and
   select the colorant combination with the smallest Euclidean distance to be used a new value for each node.

21. The system according to claim 17, wherein in determining a colorant combination for each node in the lookup table based on the image quality metric the processor is configured to select the colorant combination that minimizes the image quality metric.

22. The system according to claim 17, wherein the image quality metric is based at least on a function of a perceptual color difference value under different illuminants and a gray component replacement strategy.

23. The system according to claim 17, where in determining the set of device specific colorant combination values for each node in the lookup table, the processor is configure to:
provide an initial device dependent colorant combination for a node;
determine a target value for the initial device dependent colorant combination;
adjust the device dependent colorant value for a redundant colorant;
determine a colorant combination for the node using the resultant colorant combination value as an initial guess for the non-linear minimization algorithm; and
repeat, as necessary, the adjusting and determining until various values of the redundant color have been considered.

24. The system according to claim 23, wherein in adjusting the device dependent colorant value for a redundant colorant the processor is configure to perform a step-wise increase or decrease of the device dependent colorant value.

25. The system according to claim 23, wherein in repeating the processor is configured to perform:
one or more first passes in which the device dependent colorant value for a redundant colorant value is increased stepwise from the initial colorant value up to a maximum value; and
one or more second passes in which the device dependent colorant value for a redundant colorant value is decreased stepwise from the initial colorant value down to a minimum value.

26. The system according to claim 17, wherein the processor is configured to interpolate between the device specific colorant combination values for each node in the lookup table that are within a predetermined color difference from the node to produce additional device specific colorant combination values.

27. The system according to claim 17, wherein the non-linear minimization algorithm is a conjugate gradient algorithm.

28. A non-transitory computer-readable storage medium having computer-readable instructions stored therein that when executed by a processor are configured to implement a method for creating a color lookup table for a printer, the method comprising:
defining a plurality of nodes in a lookup table, the nodes mapping device independent color space to device specific colorant combinations based on a printer model;
determining a set of device specific colorant combination values for each node in the lookup table using a non-linear minimization algorithm to determine potential colorant combinations; and
determining a colorant combination for each node in the lookup table based on an image quality metric,
wherein the set of device specific colorant combination values for each node excludes device specific colorant combination values having a total ink coverage of primary process colors (CYM) greater than a predetermined value and device specific colorant combination values that are sampled less frequently so as to reduce the number of nodes in the look-up table.

29. The method according to claim 28, further comprising smoothing the nodes in the lookup table.

* * * * *